(12) United States Patent
Minami et al.

(10) Patent No.: US 11,043,665 B2
(45) Date of Patent: *Jun. 22, 2021

(54) NEGATIVE ELECTRODE ACTIVE MATERIAL FOR NONAQUEOUS ELECTROLYTE SECONDARY BATTERIES, AND NONAQUEOUS ELECTROLYTE SECONDARY BATTERY

(71) Applicant: SANYO Electric Co., Ltd., Daito (JP)

(72) Inventors: Hiroshi Minami, Hyogo (JP); Kouhei Tuduki, Hyogo (JP); Atsushi Fukui, Hyogo (JP); Taizou Sunano, Tokushima (JP); Yoshio Kato, Osaka (JP)

(73) Assignee: SANYO ELECTRIC CO., LTD., Daito (JP)

( * ) Notice: Subject to any disclaimer, the term of this patent is extended or adjusted under 35 U.S.C. 154(b) by 106 days.

This patent is subject to a terminal disclaimer.

(21) Appl. No.: 15/324,951

(22) PCT Filed: Aug. 27, 2015

(86) PCT No.: PCT/JP2015/004310
§ 371 (c)(1),
(2) Date: Jan. 9, 2017

(87) PCT Pub. No.: WO2016/035290
PCT Pub. Date: Mar. 10, 2016

(65) Prior Publication Data
US 2017/0214041 A1    Jul. 27, 2017

(30) Foreign Application Priority Data

Sep. 3, 2014 (JP) .............................. JP2014-179344
Jan. 28, 2015 (JP) .............................. JP2015-014158

(51) Int. Cl.
*H01M 4/36* (2006.01)
*H01M 4/38* (2006.01)
(Continued)

(52) U.S. Cl.
CPC ........... *H01M 4/364* (2013.01); *H01M 4/386* (2013.01); *H01M 4/485* (2013.01);
(Continued)

(58) Field of Classification Search
CPC .... H01M 4/364; H01M 4/386; H01M 4/5825; H01M 2004/021; H01M 2004/027
See application file for complete search history.

(56) References Cited

U.S. PATENT DOCUMENTS 4,577,878 A * 3/1986 Roy ..................... A61G 5/0816
280/250.1
2003/0053945 A1    3/2003 Fukuoka et al.
(Continued)

FOREIGN PATENT DOCUMENTS

CN    102214824 A    10/2011
CN    103400971    * 11/2013 ........... Y02E 60/122
(Continued)

OTHER PUBLICATIONS

International Search Report dated Nov. 17, 2015 issued in counterpart application No. PCT/JP2015/004310. (2 pages).
(Continued)

*Primary Examiner* — Jonathan Crepeau
*Assistant Examiner* — Angela J Martin
(74) *Attorney, Agent, or Firm* — Westerman, Hattori, Daniels & Adrian, LLP

(57) ABSTRACT

In a nonaqueous electrolyte secondary battery containing a silicon material as a negative electrode active material, the initial charge-discharge efficiency is improved. Negative electrode active material particles (10) according to an
(Continued)

embodiment each contain a lithium silicate phase (11) represented by $Li_{2z}SiO_{(2+z)}$ (where $0<z<2$) and silicon particles (12) dispersed in the lithium silicate phase (11). In base particles (13) each containing the lithium silicate phase (11) and the silicon particles (12), preferably, a peak originating from $SiO_2$ is not observed at $2\theta=25°$ in an XRD pattern obtained by XRD measurement of the particles.

15 Claims, 2 Drawing Sheets

(51) Int. Cl.
    *H01M 4/48*      (2010.01)
    *H01M 4/485*      (2010.01)
    *H01M 4/58*      (2010.01)
    *H01M 4/02*      (2006.01)

(52) U.S. Cl.
    CPC .... *H01M 4/5825* (2013.01); *H01M 2004/021* (2013.01); *H01M 2004/027* (2013.01)

(56) References Cited

U.S. PATENT DOCUMENTS

| | | | |
|---|---|---|---|
| 2011/0244333 A1* | 10/2011 | Kawada | ................ H01M 4/485 429/231.8 |
| 2011/0244334 A1 | 10/2011 | Kawada | |
| 2013/0334468 A1 | 12/2013 | Taniguchi et al. | |
| 2015/0372292 A1 | 12/2015 | Yokoi et al. | |

FOREIGN PATENT DOCUMENTS

| | | | | |
|---|---|---|---|---|
| CN | 103840136 | * | 6/2014 | ............. C01B 33/32 |
| CN | 103840136 A | | 6/2014 | |
| JP | 2003-160328 A | | 6/2003 | |
| JP | 2007-59213 A | | 3/2007 | |
| JP | 2011-222151 A | | 11/2011 | |
| JP | 2011-222153 A | | 11/2011 | |
| JP | 2011-233245 A | | 11/2011 | |
| JP | 2013-161705 A | | 8/2013 | |
| JP | 2013-235685 A | | 11/2013 | |
| JP | 2013-258076 A | | 12/2013 | |
| JP | 2014-103019 A | | 6/2014 | |
| JP | 2014103019 | * | 6/2014 | ............. H01M 4/139 |
| JP | 2015-153520 | * | 8/2015 | ............. Y02P 70/54 |
| JP | 2015-153520 A | | 8/2015 | |
| WO | 2014/119238 A1 | | 8/2014 | |

OTHER PUBLICATIONS

English Translation of Search Report dated Aug. 23, 2019, issued in counterpart CN application No. 201680005381.X. (2 pages).
English Translation of Search Report dated Sep. 20, 2019, issued in counterpart CN application No. 201680006574.7. (2 pages).

\* cited by examiner

NEGATIVE ELECTRODE ACTIVE MATERIAL FOR NONAQUEOUS ELECTROLYTE SECONDARY BATTERIES, AND NONAQUEOUS ELECTROLYTE SECONDARY BATTERY

TECHNICAL FIELD

The present disclosure relates to a negative electrode active material for a nonaqueous electrolyte secondary battery, and a nonaqueous electrolyte secondary battery.

BACKGROUND ART

Silicon materials, such as silicon (Si) and silicon oxides represented by $SiO_x$, are known to intercalate a large amount of lithium ions per unit volume, compared with carbonaceous material such as graphite. In particular, a change in the volume of $SiO_x$ due to the intercalation of lithium ions is small, compared with Si. Thus, the use of $SiO_x$ for negative electrodes of lithium ion batteries and so forth has been studied. For example, PTL 1 discloses a nonaqueous electrolyte secondary battery including a negative electrode active material containing $SiO_x$ mixed with graphite.

Nonaqueous electrolyte secondary batteries that contain negative electrode active materials containing $SiO_x$ have a disadvantage that the initial charge-discharge efficiency is low, compared with the case where graphite is used as a negative electrode active material. The main cause for this is that $SiO_x$ is changed into $Li_4SiO_4$ (irreversible reaction product) due to an irreversible reaction during charge and discharge. To inhibit the irreversible reaction to improve the initial charge-discharge efficiency, a negative electrode active material represented by $SiLi_xO_y$ ($0<x<1.0$, $0<y<1.5$) is reported (see PTL 2). PTL 3 discloses a negative electrode active material in which a lithium silicate phase containing $Li_4SiO_4$ as a main component is contained in silicon oxide.

CITATION LIST

Patent Literature

PTL 1: Japanese Published Unexamined Patent Application No. 2011-233245
PTL 2: Japanese Published Unexamined Patent Application No. 2003-160328
PTL 3: Japanese Published Unexamined Patent Application No. 2007-59213

SUMMARY OF INVENTION

Technical Problem

In each of the techniques disclosed in PTLs 2 and 3, the initial charge-discharge efficiency is improved by heat-treating a mixture of $SiO_x$ and a lithium compound at a high temperature to convert $SiO_2$ into $Li_4SiO_4$, which is an irreversible reaction product, in advance. In this process, however, $SiO_2$ is left in particles, and $Li_4SiO_4$ is formed only on surfaces of the particles. To perform the reaction up to the inside of the particles, a higher-temperature process is required. In that case, the grain size of each of Si and $Li_4SiO_4$ is assumed to increase. For example, the increase in grain size increases a change in the volume of active material particles due to charge and discharge and reduces lithium-ion conductivity.

Solution to Problem

According to an aspect of the present disclosure, a negative electrode active material for a nonaqueous electrolyte secondary battery includes a lithium silicate phase represented by $Li_{2z}SiO_{(2+z)}$ (where $0<z<2$), and silicon particles dispersed in the lithium silicate phase. In the negative electrode active material for an nonaqueous electrolyte secondary battery, a diffraction peak corresponding to a (111) plane of the lithium silicate in an XRD pattern of the negative electrode active material obtained by XRD measurement has a full width at half maximum of 0.05° or more.

Advantageous Effects of Invention

According to an aspect of the present disclosure, in a nonaqueous electrolyte secondary battery containing a silicon material as a negative electrode active material, the initial charge-discharge efficiency can be improved.

DESCRIPTION OF EMBODIMENTS

Figure 1:
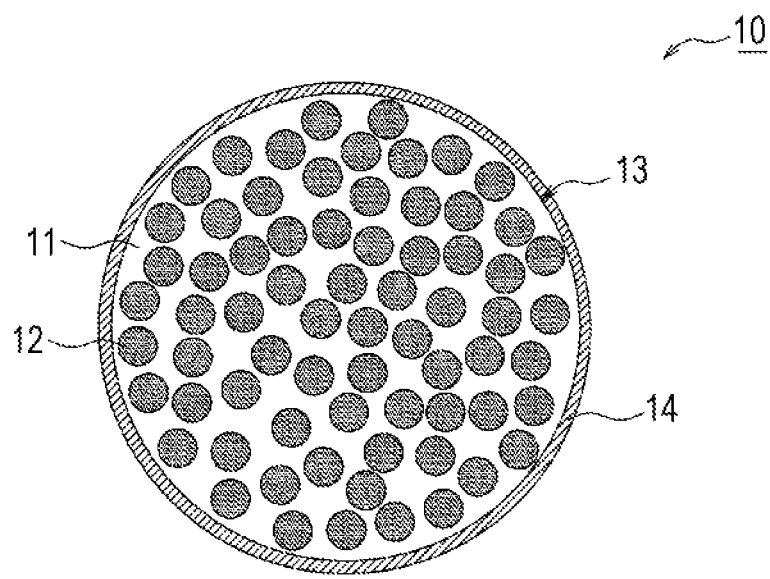
FIG. 1 is a cross-sectional view schematically illustrating a negative electrode active material for a nonaqueous electrolyte secondary battery according to an embodiment.

Embodiments will be described in detail below.
The drawings to which reference will be made in the Description of Embodiments are schematically illustrated. For example, the dimensional ratios of constituent elements in the drawings are not always the same as those of the actual objects. Specific dimensional ratios and other features are to be understood from the description provided below.

A negative electrode active material according to an embodiment of the present disclosure contains a lithium silicate phase represented by $Li_{2z}SiO_{(2+z)}$ ($0<z<2$) and silicon particles dispersed in the phase. The silicon particles preferably have an average particle diameter of 200 nm or less. The negative electrode active material according to an embodiment of the present disclosure may contain $SiO_2$ on surfaces of the silicon particles at a natural oxide film level. There are significant differences in properties between $SiO_2$ of natural oxide films and $SiO_2$ of conventional $SiO_x$ particles. For example, in an XRD pattern obtained by XRD measurement of a negative electrode active material according to an embodiment of the present disclosure, a peak corresponding to $SiO_2$ is not observed at $2\theta=25°$. The reason for this is presumably that X-rays are not diffracted because the natural oxide film is significantly thin. In contrast, in the XRD pattern of conventional $SiO_x$ particles, a peak corresponding to $SiO_2$ is observed at $2\theta=25°$.

The conventional $SiO_x$ includes fine Si particles dispersed in a $SiO_2$ matrix. Reactions described below occur during charge and discharge.

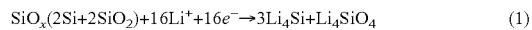

Decomposition of formula 1 with regard to Si and $2SiO_2$ leads to the following formulae.

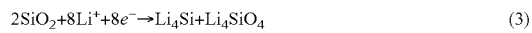

As described above, formula 3 represents an irreversible reaction. The formation of $Li_4SiO_4$ is a main cause for a reduction in initial charge-discharge efficiency.

The negative electrode active material according to an embodiment of the present disclosure includes silicon particles dispersed in the lithium silicate phase represented by $Li_{2z}SiO_{(2+z)}$ (0<z<2) and, for example, has a very low $SiO_2$ content, compared with the conventional $SiO_x$. The $SiO_2$ contained in the negative electrode active material is of the natural oxide films and has properties significantly different from those of $SiO_2$ of the conventional $SiO_x$ particles. Thus, in the nonaqueous electrolyte secondary battery containing the negative electrode active material, the reaction represented by formula 3 seems to be less likely to occur to improve the initial charge-discharge efficiency.

The negative electrode active material according to an embodiment of the present disclosure has a particle structure in which silicon particles having a small particle diameter are dispersed in the lithium silicate phase. This reduces a change in volume due to charge and discharge, thereby inhibiting the breakdown of the particle structure. In the case where a diffraction peak corresponding to the (111) plane of the lithium silicate has a full width at half maximum of 0.05° or more, the lithium silicate phase has a structure similar to an amorphous structure. This seemingly improves lithium-ion conductivity in particles composed of the negative electrode active material to reduce the change in volume due to charge and discharge. In the negative electrode active material according to an embodiment of the present disclosure, the change of the particle structure due to charge and discharge is small, compared with the conventional $SiO_x$ particles. In a nonaqueous electrolyte secondary battery containing the negative electrode active material according to an embodiment of the present disclosure, good initial charge-discharge efficiency is obtained.

A nonaqueous electrolyte secondary battery according to an embodiment includes a negative electrode containing the negative electrode active material, a positive electrode, and a nonaqueous electrolyte containing a nonaqueous solvent. A separator is preferably arranged between the positive electrode and the negative electrode. An example of the structure of the nonaqueous electrolyte secondary battery is a structure including a case that houses a nonaqueous electrolyte and an electrode assembly in which a positive electrode and a negative electrode are wound with a separator provided therebetween. A differently structured electrode assembly, such as a stacked electrode assembly in which positive electrodes and negative electrodes are stacked with separators provided therebetween, may be used in place of the wound electrode assembly. The nonaqueous electrolyte secondary battery may have any form, for example, a cylinder form, a prism form, a coin form, a button form, or a laminate form.

[Positive Electrode]

The positive electrode preferably includes a positive electrode current collector formed of, for example, metal foil, and a positive electrode mixture layer arranged on the current collector. For the positive electrode current collector, foil composed of a metal, such as aluminum, stable in the potential range of the positive electrode, a film including a surface layer composed of the metal, or the like may be used. The positive electrode mixture layer preferably contains a conductive material and a binder in addition to a positive electrode active material. Particle surfaces of the positive electrode active material may be covered with fine particles of an inorganic compound, for example, an oxide, e.g., aluminum oxide ($Al_2O_3$), a phosphate compound, or a borate compound.

Examples of the positive electrode active material include lithium transition metal oxides containing transition metal elements, such as Co, Mn, and Ni. Examples of the lithium transition metal oxides include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, and $Li_2MPO_4F$ (where M represents at least one of Na, Mg, Sc, Y, Mn, Fe, Co, Ni, Cu, Zn, Al, Cr, Pb, Sb, and B, 0<x≤1.2, 0<y≤0.9, 2.0≤z≤2.3). These may be used separately or in combination as a mixture of two or more.

The conductive material is used in order to increase the electrical conductivity of the positive electrode mixture layer. Examples of the conductive material include carbon materials, such as carbon black, acetylene black, Ketjenblack, and graphite. These may be used separately or in combination of two or more.

The binder is used in order to maintain a good contact state between the positive electrode active material and the conductive material and enhance the bondability of the positive electrode active material and so forth to a surface of the positive electrode current collector. Examples of the binder include fluorine-based resins, such as polytetrafluoroethylene (PTFE) and polyvinylidene fluoride (PVdF), polyacrylonitrile (PAN), polyimide-based resins, acrylic-based resins, and polyolefin-based resins. These resins may be used in combination with carboxymethyl cellulose (CMC), its salts (e.g., CMC-Na, CMC-K, and CMC-NH$_4$; and partially neutralized salts may also be usable), polyethylene oxide (PEO), and so forth. These may be used separately or in combination of two or more.

[Negative Electrode]

The negative electrode preferably includes a negative electrode current collector formed of, for example, metal foil, and a negative electrode mixture layer arranged on the current collector. For the negative electrode current collector, foil composed of a metal, such as copper, stable in the potential range of the negative electrode, a film including a surface layer composed of the metal, or the like may be used. The negative electrode mixture layer preferably contains a binder in addition to the negative electrode active material. As with the case of the positive electrode, examples of the binder that may be used include fluorine-based resins, PAN, polyimide-based resins, acrylic-based resins, and polyolefin-based resins. When a mixture slurry is prepared with an aqueous solvent, CMC or its salt (e.g., CMC-Na, CMC-K, or CMC-NH$_4$; or a partially neutralized salt may be used), styrene-butadiene rubber (SBR), polyacrylic acid (PAA) or its salt (e.g., PAA-Na or PAA-K; or a partially neutralized salt may be used), or polyvinyl alcohol (PVA) may be preferably used.

FIG. 1 is a cross-sectional view of one of negative electrode active material particles 10 according to an embodiment.

As illustrated in FIG. 1, each of the negative electrode active material particles 10 contains a lithium silicate phase 11 and silicon particles 12 dispersed in the phase. Preferably, the negative electrode active material particles 10 contain $SiO_2$ at a natural oxide film level, and a peak corresponding to $SiO_2$ is not observed at 2θ=25° in an XRD pattern obtained by XRD measurement of the negative electrode active material particles 10. A conductive layer 14 is preferably arranged on a surface of a base particle 13 containing the lithium silicate phase 11 and the silicon particles 12.

The base particle 13 may contain a third component other than the lithium silicate phase 11 or the silicon particles 12. When the base particle 13 contains $SiO_2$ of a natural oxide film, the base particle 13 preferably has a $SiO_2$ content less than 10% by mass and more preferably less than 7% by mass. A smaller particle diameter of the silicon particles 12 results in a larger surface area and thus a larger amount of $SiO_2$ of the natural oxide film.

The silicon particles 12 in the negative electrode active material particles 10 can intercalate a large amount of lithium ions, compared with those of carbon materials such as graphite. Thus, the use of the negative electrode active material particles 10 as a negative electrode active material contributes to an increase in the capacity of a battery. The negative electrode active material particles 10 may be used alone as the negative electrode active material in the negative electrode mixture layer. However, a change in the volume of the silicon material due to charge and discharge is larger than that of graphite. Thus, in order to achieve higher capacity and maintain good cycle characteristics, another active material that exhibits only a small change in volume may be used in combination. As the another active material, a carbon material such as graphite is preferred.

Examples of the graphite that may be used include graphites that have been used as negative electrode active materials, for example, natural graphites, such as flake graphite, massive graphite, and earthy graphite, and artificial graphites, such as massive artificial graphite (MAG) and graphitized mesophase carbon microbeads (MCMB). In the case where graphite is used in combination, the ratio by mass of the negative electrode active material particle 10 to graphite is preferably 1:99 to 30:70. When the ratio of the negative electrode active material particles 10 to graphite is in the range, both of an increase in capacity and improvement in cycle characteristics are easily achieved. When the ratio of the negative electrode active material particles 10 to graphite is less than 1% by mass, the increase in capacity by the addition of the negative electrode active material particles 10 is not so advantageous.

In the negative electrode active material particles 10 (base particles 13), preferably, the fine silicon particles 12 are substantially uniformly dispersed in the lithium silicate phase 11. For example, each of the base particles 13 has a sea-island structure in which fine Si is dispersed in a lithium silicate matrix and Si is substantially uniformly dispersed in any cross section without being localized in a region. The content of the silicon particles 12 (Si) in the base particles 13 is preferably 20% to 95% by mass and more preferably 35% to 75% by mass with respect to the total mass of the base particles 13 from the viewpoints of increasing the capacity and improving the cycle characteristics. An excessively low content of Si leads to, for example, a reduction in charge-discharge capacity and the degradation of load characteristics due to insufficient diffusion of lithium ions. At an excessively high content of Si, for example, part of Si is exposed without being covered with a lithium silicate and thus comes into contact with an electrolytic solution to degrade the cycle characteristics.

Figure 2:
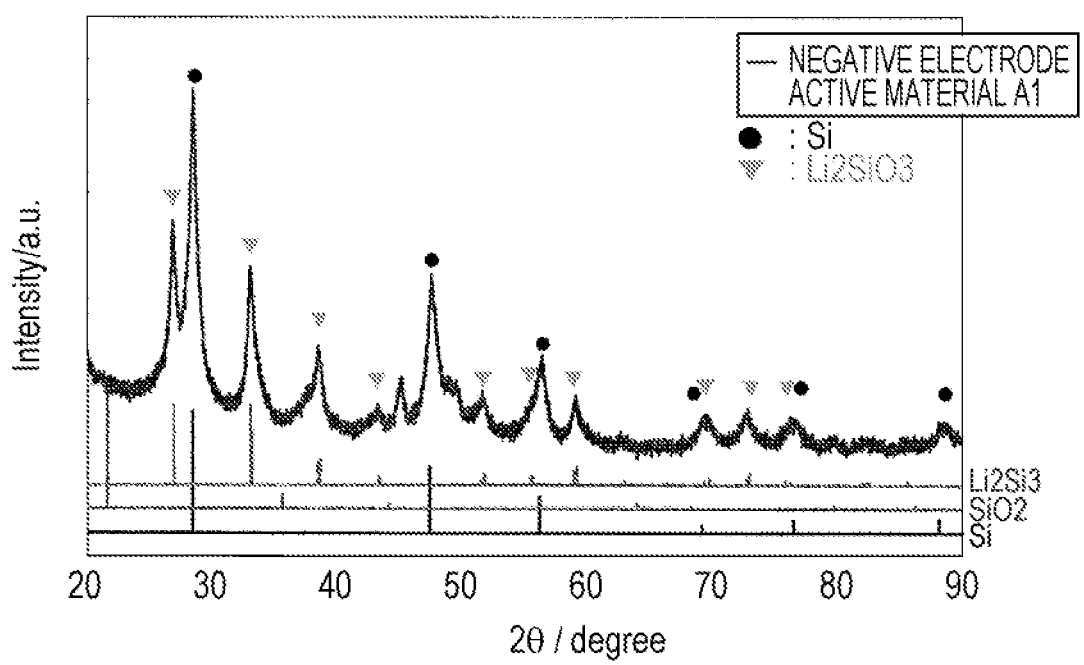
FIG. 2 illustrates an XRD pattern of a negative electrode active material according to an embodiment (Example 1) for a nonaqueous electrolyte secondary battery.

The lithium silicate phase 11 and the silicon particles 12 are preferably formed of fine particles. The lithium silicate phase 11 is formed of, for example, finer particles than the silicon particles 12. FIG. 2 illustrates an XRD pattern of the base particles 13 before charge and discharge. In the XRD pattern of FIG. 2, the intensities of peaks originating from the lithium silicate and Si are weak, and the peaks originating from the lithium silicate are smaller than peaks originating from Si. Regarding the base particles 13, the peaks originating from the lithium silicate are preferably smaller than the peaks originating from Si in the XRD pattern. In the XRD pattern of the negative electrode active material particles 10, for example, the intensity of a diffraction peak corresponding to the (111) plane of Si is greater than that of a diffraction peak corresponding to the (111) plane of the lithium silicate.

The lithium silicate phase 11 is composed of a lithium silicate represented by $Li_{2z}SiO_{(2+z)}$ ($0<z<2$). That is, the lithium silicate contained in the lithium silicate phase 11 does not include $Li_4SiO_4$ ($Z=2$). $Li_4SiO_4$ is an unstable compound and reacts with water to be alkaline. This alters Si to reduce the charge-discharge capacity. The lithium silicate phase 11 is preferably composed of $Li_2SiO_3$ ($Z=1$) or $Li_2Si_2O_5$ ($Z=1/2$) serving as a main component (component whose proportion by mass is highest) in view of stability, ease of production, lithium-ion conductivity, and so forth. In the case where $Li_2SiO_3$ or $Li_2Si_2O_5$ is used as a main component, the content of the main component is preferably more than 50% by mass and more preferably 80% by mass or more with respect to the total mass of the lithium silicate phase 11.

The silicon particles 12 have an average particle diameter of, for example, 500 nm or less, preferably 200 nm or less, and more preferably 50 nm or less before initial charge. After charge and discharge, the silicon particles 12 preferably have an average particle diameter of 400 nm or less and more preferably 100 nm or less. A reduction in the size of the silicon particles 12 reduces a change in volume during charge and discharge, thereby easily inhibiting the breakdown of an electrode structure. The average particle diameter of the silicon particles 12 is measured by observation of cross sections of the negative electrode active material particles 10 with a SEM or TEM. Specifically, the average particle diameter of the silicon particles 12 is determined by averaging the maximum diameters of 100 particles selected from the silicon particles 12.

In the XRD pattern obtained by XRD measurement of the negative electrode active material particles 10 (base particles 13), a diffraction peak corresponding to the (111) plane of the lithium silicate has a full width at half maximum of 0.05° or more. As described above, the full width at half maximum is adjusted to 0.05° or more to reduce the crystallinity of the lithium silicate phase. This seemingly improves lithium-ion conductivity in the particle to reduce the change in the volume of the silicon particles 12 due to charge and discharge. The full width at half maximum of the diffraction peak corresponding to the (111) plane of the lithium silicate varies slightly, depending on the component of the lithium silicate phase 11, and is preferably 0.09° or more, for example, in the range of 0.09° to 0.55°.

The full width at half maximum of the diffraction peak corresponding to the (111) plane of the lithium silicate is measured under conditions described below. In the case where multiple types of lithium silicates are contained, the full width at half maximum (° ($2\theta$)) of a diffraction peak corresponding to the (111) plane of each of the multiple types of lithium silicates is measured. In the case where a diffraction peak corresponding to the (111) plane of a lithium silicate overlaps a diffraction peak corresponding to different plane indices or a diffraction peak originating from another substance, the diffraction peak corresponding to the (111) plane of the lithium silicate is isolated, and then the full width at half maximum is measured. Measurement apparatus: X-ray diffractometer (Model: RINT-TTRII), manufactured by Rigaku Corporation
Anticathode: Cu
Tube voltage: 50 kV
Tube current: 300 mA
Optical system: collimated beam system
[Incident side: multilayer mirror (divergence angle: 0.05°, beam width: 1 mm), Soller slit (5°); Receiving side: long slit PSA200 (resolution: 0.057°), Soller slit)(5° ]
Step width: 0.01° or 0.02°
Counting time: 1 to 6 s In the case where the lithium silicate phase 11 is composed of $Li_2Si_2O_5$ serving as a main component, a diffraction peak corresponding to the (111) plane of $Li_2Si_2O_5$ in an XRD pattern of the negative electrode active material particles 10 preferably has a full width at half maximum of 0.09° or more. For example, in the case where $Li_2Si_2O_5$ accounts for 80% by mass or more of the total mass of the lithium silicate phase 11, an example of a preferred full width at half maximum of the diffraction peak is in the range of 0.09° to 0.55°. In the case where the lithium silicate phase 11 is composed of $Li_2SiO_3$ serving as a main component, a diffraction peak corresponding to the (111) plane of $Li_2SiO_3$ in an XRD pattern of the negative electrode active material particles 10 preferably has a full width at half maximum of 0.10° or more. For example, in the case where $Li_2SiO_3$ accounts for 80% by mass or more of the total mass of the lithium silicate phase 11, an example of a preferred full width at half maximum of the diffraction peak is in the range of 0.10° to 0.55°.

The negative electrode active material particles 10 preferably have an average particle diameter of 1 to 15 μm and more preferably 4 to 10 μm from the viewpoint of, for example, increasing the capacity and improving the cycle characteristics. Here, the average particle diameter of the negative electrode active material particles 10 indicates a particle diameter (volume mean diameter) at an accumulated volume of 50% of a particle size distribution of primary particles measured by a laser diffraction/scattering method (for example, with "LA-750" manufactured by HORIBA, Ltd). An excessively small average particle diameter of the negative electrode active material particles 10 results in a large surface area; hence, the amount of the negative electrode active material particles 10 reacting with the electrolyte tends to increase, thereby reducing the capacity. An excessively large average particle diameter results in an increase in the amount of volume change due to charge and discharge; hence, the cycle characteristics tend to degrade. The conductive layer 14 is preferably arranged on a surface of each of the negative electrode active material particles 10 (base particles 13). However, the conductive layer 14 does not affect the average particle diameter of the negative electrode active material particles 10 because of the small thickness of the conductive layer 14 (particle diameter of the negative electrode active material particles 10≈particle diameter of the base particles 13).

The base particles 13 are formed through, for example, the following steps 1 to 3.
(1) Si and a lithium silicate are mixed together in a ratio by mass of 20:80 to 95:5 to prepare a mixture.
(2) The mixture is pulverized into fine particles with a ball mill. A mixture may be prepared by reducing the size of a powder of each of the raw materials and mixing the resulting powders together.
(3) The pulverized mixture is subjected to, for example, heat treatment in an inert atmosphere at 600° C. to 1000° C. In the heat treatment, a pressure may be applied to form a sintered member, like hot pressing. In this case, the sintered member is pulverized into particles having a predetermined particle diameter. The lithium silicate represented by $Li_{2z}SiO_{(2+z)}$ (0<z<2) is stable in the temperature range and does not react with Si; hence, the capacity is not reduced. The base particles 13 may be produced by synthesizing Si nanoparticles and lithium silicate nanoparticles without using a ball mill, mixing these nanoparticles together, and performing heat treatment.

Each of the negative electrode active material particles 10 preferably includes the conductive layer 14 on the particle surface, the conductive layer 14 being composed of a material with higher conductivity than the lithium silicate phase 11 and the silicon particles 12. A conductive material contained in the conductive layer 14 is preferably electrochemically stable and is preferably at least one selected from the group consisting of carbon materials, metals, and metal compounds. As the carbon materials, carbon black, acetylene black, Ketjenblack, and graphite, and mixtures of two or more of them may be used, as with the conductive materials for the positive electrode mixture layer. As the metals, copper, nickel, and alloys thereof, which are stable in a potential range of the negative electrode, may be used. As the metal compounds, copper compounds, nickel compounds, and so forth may be exemplified (layers of the metal or metal compound may be formed on surfaces of the base particles 13 by, for example, electroless plating). Among these, the carbon materials are particularly preferably used.

Examples of a method for coating the surfaces of the base particles 13 with carbon include a CVD method with acetylene, methane, or the like; and a method in which coal pitch, petroleum pitch, a phenolic resin, or the like is mixed with the base particles 13 and then heat treatment is performed. Carbon coating layers may be formed by fixing carbon black, Ketjenblack, or the like to the surfaces of the base particles 13 with a binder.

Each of the conductive layers 14 is preferably arranged so as to cover substantially the whole of the region of the surface of a corresponding one of the base particles 13. Each conductive layer 14 preferably has a thickness of 1 to 200 nm and more preferably 5 to 100 nm from the viewpoint of achieving good conductivity and the diffusibility of lithium ions into the base particles 13. An excessively small thickness of the conductive layer 14 results in low conductivity and makes it difficult to uniformly cover each of the base particles 13. An excessive large thickness of the conductive layer 14 has a tendency to inhibit the diffusion of lithium ions into the base particle 13 to reduce the capacity. The thickness of the conductive layer 14 may be measured by cross-sectional observation of particles with, for example, a SEM or TEM.

[Nonaqueous Electrolyte]

The nonaqueous electrolyte contains a nonaqueous solvent and an electrolyte salt dissolved in the nonaqueous solvent. The nonaqueous electrolyte is not limited to a liquid electrolyte (nonaqueous electrolyte solution) and may be a solid electrolyte containing a gel-like polymer or the like. Examples of the nonaqueous solvent that may be used include esters, ethers, nitriles such as acetonitrile, amides such as dimethylformamide, and solvent mixtures of two or more of them. The nonaqueous solvent may contain a halogen-substituted solvent in which at least one hydrogen atom of each of the solvents is replaced with a halogen atom such as a fluorine atom.

Examples of the esters include cyclic carbonates, such as ethylene carbonate (EC), propylene carbonate (PC), and butylene carbonate; chain carbonates, such as dimethyl carbonate (DMC), methyl ethyl carbonate (EMC), diethyl carbonate (DEC), methyl propyl carbonate, ethyl propyl carbonate, and methyl isopropyl carbonate; cyclic carboxylates, such as γ-butyrolactone (GBL) and γ-valerolactone (GVL); chain carboxylates, such as methyl acetate, ethyl acetate, propyl acetate, methyl propionate (MP), ethyl propionate, and γ-butyrolactone.

Examples of the ethers include cyclic ethers, such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers; and chain ethers, such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl.

As the halogen-substituted solvent, a fluorinated cyclic carbonate such as fluoroethylene carbonate (FEC), a fluorinated chain carbonate, a fluorinated chain carboxylate such as fluoromethyl propionate (FMP), or the like is preferably used.

The electrolyte salt is preferably a lithium salt. Examples of the lithium salt include $LiBF_4$, $LiClO_4$, $LiPF_6$, $LiAsF_6$, $LiSbF_6$, $LiAlCl_4$, LiSCN, $LiCF_3SO_3$, $LiCF_3CO_2$, $Li(P(C_2O_4)F_4)$, $LiPF_{6-x}(C_nF_{2n+1})_x$ (where 1<x<6, and n represents 1 or 2), $LiB_{10}Cl_{10}$, LiCl, LiBr, LiI, chloroborane lithium, lower aliphatic lithium carboxylates, borates, such as $Li_2B_4O_7$ and $Li(B(C_2O_4)F_2)$, and imide salts, such as $LiN(SO_2CF_3)_2$ and $LiN(C_lF_{2l+1}SO_2)(C_mF_{2m+1}SO_2)$ {where l and m each represent an integer of 1 or more}. These lithium salts may be used separately or in combination as a mixture of two or more of them. Among these, $LiPF_6$ is preferably used in view of ionic conductivity and electrochemical stability. The concentration of the lithium salt is preferably 0.8 to 1.8 mol per liter of the nonaqueous solvent.

[Separator]

As the separator, a porous sheet having ion permeability and insulating properties is used. Specific examples of the porous sheet include fine porous thin membranes, woven fabrics, and nonwoven fabrics. Preferred examples of a material of the separator include olefin-based resins, such as polyethylene and polypropylene; and cellulose. The separator may be formed of a laminated body including a cellulose fiber layer and a thermoplastic resin fiber layer composed of an olefin-based resin or the like.

EXAMPLES

While the present invention will be further described below by examples, the present invention is not limited to these examples.

Example 1

[Production of Negative Electrode Active Material]

Si (three nines (3 N), pulverized to 10 μm) and $Li_2SiO_3$ (pulverized to 10 μm) were mixed together in a ratio by mass of 50:50 in an inert atmosphere and charged into a pot (composed of stainless steel (SUS), volume: 500 mL) of a planetary ball mill (P-5, manufactured by Fritsch). Into the pot, 24 balls (diameter: 20 mm) composed of stainless steel (SUS) were charged. A lid was closed. Pulverization treatment was performed at 200 rpm for 50 hours. Then the resulting powder was removed in an inert atmosphere and subjected to heat treatment in an inert gas atmosphere at 800° C. for 4 hours. The heat-treated powder (hereinafter, referred to as "base particles") was pulverized. The pulverized powder was passed through a mesh with 40-μm openings, mixed with coal pitch (MCP250, manufactured by JFE Chemical Corporation), and subjected to heat treatment in an inert atmosphere at 800° C. to coat surfaces of the base particles with carbon, thereby forming conductive layers. The coating weight of carbon is 5% by mass with respect to the total mass of the particles including the base particles and the conductive layers. The average particle diameter of the resulting particles was adjusted to 5 μm with a sieve to produce negative electrode active material A1.

[Analysis of Negative Electrode Active Material]

TEM observation of a cross section of negative electrode active material A1 revealed that the Si particles had an average particle diameter less than 50 nm. SEM observation of the cross section of negative electrode active material A1 revealed that the Si particles were substantially uniformly dispersed in a matrix composed of $Li_2SiO_3$. In an XRD pattern of negative electrode active material A1 (see FIG. 2), peaks originating mainly from Si and $Li_2SiO_3$ were observed. The intensities of these peaks were as follows: Si>$Li_2SiO_3$. No peak originating from $SiO_2$ was observed at 2θ=25°. Measurement of negative electrode active material A1 by Si-NMR revealed that the content of $SiO_2$ was less than 7% by mass (equal to or lower than the minimum limit of detection).

[Production of Negative Electrode]

The negative electrode active material and polyacrylonitrile (PAN) were mixed together in a ratio by mass of 95:5. After addition of N-methyl-2-pyrrolidone (NMP), the resulting mixture was stirred with a mixer ("AWATORI RENTARO" (Thinky Mixer), manufactured by Thinky Corporation) to prepare a negative electrode mixture slurry. The slurry was applied to a surface of copper foil in such a manner that the mass of a negative electrode mixture layer was 25 g per square meter. The resulting coating film was dried in air at 105° C. and subjected to rolling to produce a negative electrode. The negative electrode mixture layer had a packing density of 1.50 g/cm³.

[Preparation of Nonaqueous Electrolytic Solution]

$LiPF_6$ was added to a solvent mixture of ethylene carbonate (EC) and diethyl carbonate (DEC) mixed in a ratio by volume of 3:7 to prepare a nonaqueous electrolytic solution having a concentration of 1.0 mol/L.

[Production of Nonaqueous Electrolyte Secondary Battery]

Lithium metal foil and the negative electrode provided with a Ni tab were arranged in an inert atmosphere so as to face each other with a polyethylene separator interposed therebetween, thereby forming an electrode assembly. The electrode assembly was placed in a battery case formed of an aluminum laminated film. The nonaqueous electrolytic solution was injected into the battery case. The battery case was sealed, thereby producing battery T1.

Example 2

Negative electrode active material A2 and battery T2 were produced in the same way as in Example 1, except that the treatment time with the ball mill was changed to 200 hours.

The Si particles had an average particle diameter less than 10 nm.

Example 3

Negative electrode active material A3 and battery T3 were produced in the same way as in Example 1, except that the treatment time with the ball mill was changed to 10 hours. The Si particles had an average particle diameter less than 200 nm.

Example 4

Negative electrode active material A4 and battery T4 were produced in the same way as in Example 1, except that the treatment time with the ball mill was changed to 2 hours. The Si particles had an average particle diameter less than 500 nm.

Example 5

Negative electrode active material A5 and battery T5 were produced in the same way as in Example 1, except that $Li_2Si_2O_5$ was used in place of $Li_2SiO_3$. In an XRD pattern of negative electrode active material A5, peaks originating from Si and $Li_2Si_2O_5$ were observed. A peak originating from $Li_2SiO_3$ was also observed. The intensities of these peaks were as follows: $Si>Li_2Si_2O_5>Li_2SiO_3$.

Comparative Example 1

Si (three nines (3 N), pulverized to 10 μm) and $Li_2SiO_3$ (pulverized to 10 μm) were each pulverized in an inert atmosphere for 50 hours with the ball mill and then were mixed together in a ratio by mass of 50:50. The resulting mixture was directly used as negative electrode active material B1 without heat treatment. Battery R1 was produced in the same way as in Example 1. In negative electrode active material B1, while $Li_2SiO_3$ particles adhered to surfaces of the Si particles, a $Li_2SiO_3$ matrix (continuous phase) was not formed. That is, negative electrode active material B1 did not have a composite particle structure in which the Si particles were dispersed in the $Li_2SiO_3$ phase.

Comparative Example 2

Battery R2 was produced in the same way as in Example 1, except that $SiO_x$ coated with carbon layers was used as negative electrode active material B2, the $SiO_x$ coated with carbon layers being produced by mixing $SiO_x$ (where x=0.97, and average particle diameter: 5 μm) with the coal pitch and subjecting the mixture to heat treatment in an inert atmosphere at 800° C.

Regarding the batteries of Examples 1 to 5 and Comparative examples 1 and 2, the initial charge-discharge efficiency was evaluated by a method described below. Table 1 lists the evaluation results.

[Initial Charge-Discharge Efficiency]

Charge

Constant-current charge was performed at a current of 0.2 It until the voltage reached 0 V. Subsequently, constant-current charge was performed at a current of 0.05 It until the voltage reached 0 V.

Discharge

Constant-current discharge was performed at a current of 0.2 It until the voltage reached 1.0 V.

Interval

An interval between the charge and the discharge was 10 minutes.

The ratio of discharge capacity to charge capacity at the first cycle was defined as initial charge-discharge efficiency.

Initial charge-discharge efficiency (%)=discharge capacity at first cycle/charge capacity at first cycle×100

TABLE 1

| | Average particle diameter of Si | Lithium silicate | Structure of particles | Initial charge-discharge efficiency |
|---|---|---|---|---|
| T1 | <50 nm | $Li_2SiO_3$ | composite particles | 85% |
| T2 | <10 nm | | | 87% |
| T3 | <200 nm | | | 82% |
| T4 | <500 nm | | | 78% |
| T5 | <50 nm | $Li_2Si_2O_5$ | | 85% |
| R1 | <50 nm | $Li_2SiO_3$ | mixed particles | 71% |
| R2 | — | — | composite particles | 68% |

As listed in Table 1, each of batteries T1 to T5 of these examples has good initial charge-discharge efficiency, compared with batteries R1 and R2 of these comparative examples. In other words, the use of the composite particles for a negative electrode active material, the composite particles each containing the Si particles dispersed in the $Li_2SiO_3$ or $Li_2Si_2O_5$ matrix, improves the initial charge-discharge efficiency, compared with the case where the Si particles and $Li_2SiO_3$ particles are merely mixed together or where $SiO_x$ is used. In each of the batteries of these examples, a smaller average particle diameter of the Si particles resulted in better initial charge-discharge efficiency. The main cause for the results is presumably that the change in volume due to charge and discharge decreased with decreasing diameter of the Si particles.

Example 6

[Production of Positive Electrode]

Lithium cobaltate, acetylene black (HS100, manufactured by Denki Kagaku Kogyo K.K.), and polyvinylidene fluoride (PVdF) were mixed together in a ratio by mass of 95:2.5:2.5. After N-methyl-2-pyrrolidone (NMP) serving as a dispersion medium was added to the resulting mixture, the mixture was stirred with a mixer (T.K. HIVIS MIX, manufactured by PRIMIX Corporation) to prepare a positive electrode mixture slurry. The positive electrode mixture slurry was applied to aluminum foil, dried, subjected to rolling with reduction rolls, thereby producing a positive electrode including a positive electrode mixture layer formed on each surface of the aluminum foil, the positive electrode mixture layer having a density of 3.6 g/cm³.

[Production of Negative Electrode]

Negative electrode active material A1 used in Example 1 and graphite were mixed together in a ratio by mass of 5:95. The resulting mixture was used as negative electrode active material A6 (negative electrode active material A1: 5% by mass). Negative electrode active material A6, sodium carboxymethyl cellulose (CMC-Na), and styrene-butadiene rubber (SBR) were mixed together in a ratio by mass of 97.5:1.0:1.5. Water was added thereto. The resulting mixture was stirred with a mixer (T.K. HIVIS MIX, manufactured by PRIMIX Corporation) to prepare a negative electrode mixture slurry. The slurry was applied to copper foil in such a manner that the mass of a negative electrode mixture layer was 190 g per square meter. The resulting coating film was dried in air at 105° C. and subjected to rolling to produce a negative electrode including the negative electrode mixture layer formed on each surface of the copper foil, the negative electrode mixture layer having a density of 1.5 g/cm$^3$.

[Production of Nonaqueous Electrolyte Secondary Battery]

Tabs were attached to the electrodes. The positive electrode and the negative electrode equipped with the tabs were spirally wound with a separator interposed therebetween in such a manner that the tabs were located at the outermost peripheral portion. The resulting electrode assembly was inserted into a case formed of an aluminum laminated sheet. After vacuum drying was performed at 105° C. for 2 hours, the nonaqueous electrolytic solution was injected. An opening portion of the case was sealed, thereby producing battery T6. The design capacity of the battery was 800 mAh.

Example 7

Negative electrode active material A7 and battery T7 were produced in the same way as in Example 6, except that the amount of negative electrode active material A1 added was changed to 10% by mass.

Example 8

Negative electrode active material A8 and battery T8 were produced in the same way as in Example 6, except that the amount of negative electrode active material A1 added was changed to 30% by mass.

Comparative Example 3

Negative electrode active material B3 and battery R3 were produced in the same way as in Example 6, except that negative electrode active material B2 used in Comparative example 2 was used in place of negative electrode active material A1.

Comparative Example 4

Negative electrode active material B4 and battery R4 were produced in the same way as in Example 6, except that negative electrode active material B2 was used in place of negative electrode active material A1.

Comparative Example 5

Negative electrode active material B5 and battery R5 were produced in the same way as in Example 6, except that negative electrode active material B2 was used in place of negative electrode active material A1.

Regarding the batteries of Examples 6 to 8 and Comparative examples 3 to 5, the initial charge-discharge efficiency and the charge-discharge cycle characteristics were evaluated by methods described below. Table 2 lists the evaluation results.

[Initial Charge-Discharge Efficiency]

Charge

Constant-current charge was performed at a current of 1 It (800 mA) until the voltage reached 4.2 V. Subsequently, voltage-constant charge was performed at a voltage of 4.2 V until the current reached 1/20 It (40 mA).

Discharge

Constant-current discharge was performed at a current of 1 It (800 mA) until the voltage reached 2.75 V.

Interval

An interval between the charge and the discharge was 10 minutes.

The initial charge-discharge efficiency of each of the batteries was measured under the charge-discharge conditions.

[Cycle Test]

Each of the batteries was subjected to a cycle test under the charge-discharge conditions. The number of cycles required to cause the discharge capacity to reach 80% of the discharge capacity at the first cycle was measured and was defined as a cycle life. The cycle life of each of the batteries is indicated as an index when the cycle life of battery R3 is defined as 100.

TABLE 2

|    | A1/B2       | Initial charge-discharge efficiency | Cycle life |
|----|-------------|-------------------------------------|------------|
| T6 | 5% by mass  | 92%                                 | 102        |
| R3 |             | 87%                                 | 100        |
| T7 | 10% by mass | 90%                                 | 45         |
| R4 |             | 84%                                 | 42         |
| T8 | 30% by mass | 86%                                 | 36         |
| R5 |             | 76%                                 | 32         |

As listed in Table 2, each of the batteries of the examples had initial charge-discharge efficiency higher than and a cycle characteristics comparable to or better than those of the batteries of the comparative examples.

Example 9

[Production of Negative Electrode Active Material]

A Si powder (three nines (3 N), pulverized to 10 μm) and a Li$_2$SiO$_3$ powder (pulverized to 10 μm) were mixed together in a ratio by mass of 42:58 in an inert atmosphere and charged into a pot (composed of stainless steel (SUS), volume: 500 mL) of a planetary ball mill (P-5, manufactured by Fritsch). Into the pot, 24 balls (diameter: 20 mm) composed of stainless steel (SUS) were charged. A lid was closed. Pulverization treatment was performed at 200 rpm for 50 hours. Then the resulting powder was removed in an inert atmosphere and subjected to heat treatment in an inert gas atmosphere at 600° C. for 4 hours. The heat-treated powder (hereinafter, referred to as "base particles") was pulverized. The pulverized powder was passed through a mesh with 40-μm openings, mixed with coal pitch (MCP250, manufactured by JFE Chemical Corporation), and subjected to heat treatment in an inert atmosphere at 800° C. for 5 hours to coat surfaces of the base particles with carbon, thereby forming conductive layers. The coating weight of carbon is 5% by mass with respect to the total mass of the particles including the base particles and the conductive layers. The average particle diameter of the resulting particles was adjusted to 5 μm with a sieve to produce negative electrode active material A9.

[Analysis of Negative Electrode Active Material]

Figure 3:
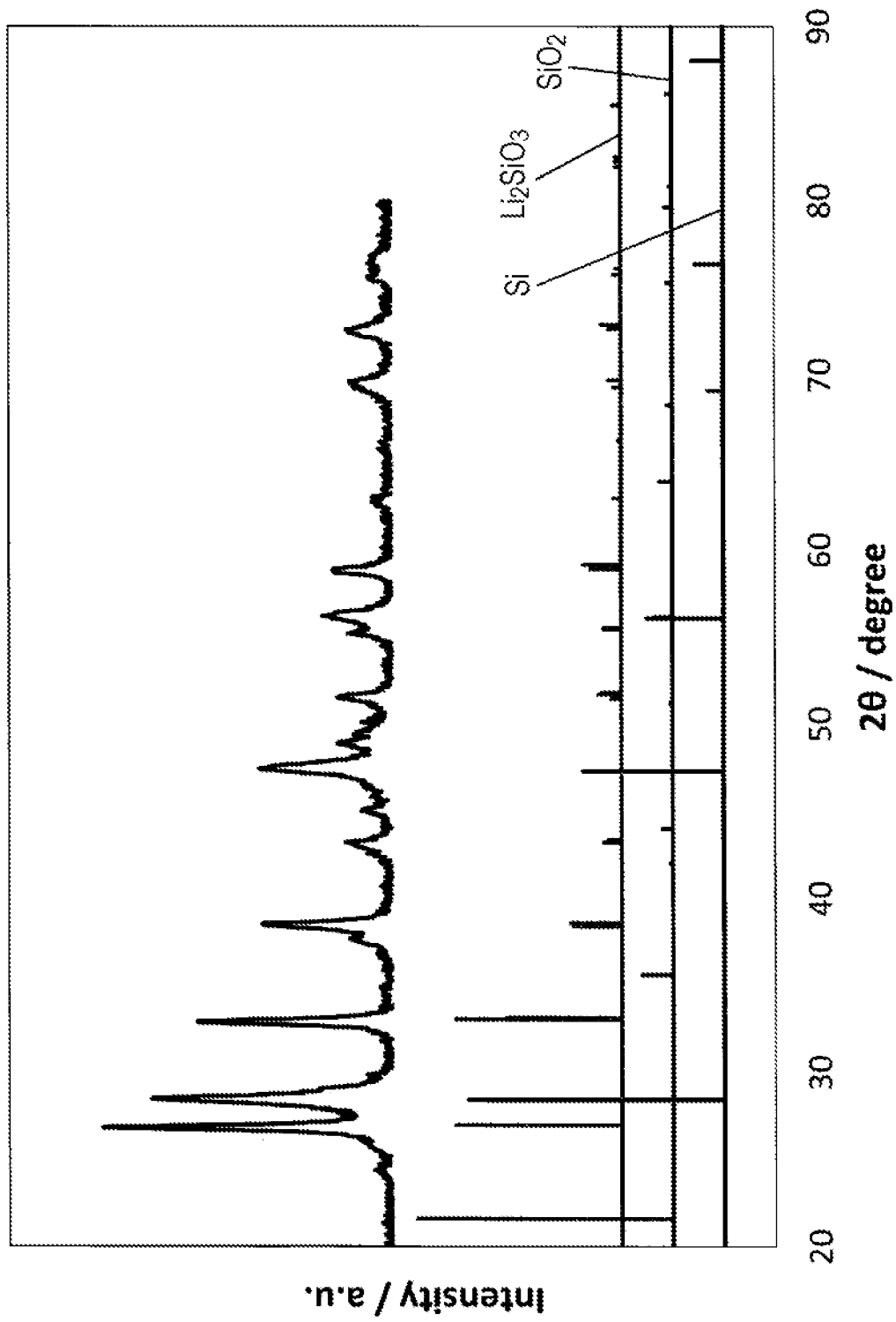
FIG. 3 illustrates an XRD pattern of a negative electrode active material according to an embodiment (Example 9) for a nonaqueous electrolyte secondary battery.

SEM observation of the cross section of particles of negative electrode active material A9 revealed that the Si particles had an average particle diameter less than 100 nm and that the Si particles were substantially uniformly dispersed in a matrix composed of Li$_2$SiO$_3$. FIG. 3 illustrates an XRD pattern of negative electrode active material A9. In the XRD pattern of negative electrode active material A9, peaks originating mainly from Si and $Li_2SiO_3$ were observed. A peak which was observed at 2θ=about 27.0° and which corresponded to a plane with Miller indices (111) of $Li_2SiO_3$ had a full width at half maximum of 0.233°. A diffraction peak originating from $SiO_2$ was not observed at 2θ=25°. Measurement of negative electrode active material A9 by Si-NMR revealed that the content of $SiO_2$ was less than 7% by mass (equal to or lower than the minimum limit of detection).

[Production of Negative Electrode]

The negative electrode active material and polyacrylonitrile (PAN) were mixed together in a ratio by mass of 95:5. After addition of N-methyl-2-pyrrolidone (NMP), the resulting mixture was stirred with a mixer ("AWATORI RENTARO" (Thinky Mixer), manufactured by Thinky Corporation) to prepare a negative electrode mixture slurry. The slurry was applied to a surface of copper foil in such a manner that the mass of a negative electrode mixture layer was 25 g per square meter. The resulting coating film was dried in air at 105° C. and subjected to rolling to produce a negative electrode. The negative electrode mixture layer had a packing density of 1.50 $g/cm^3$.

[Preparation of Nonaqueous Electrolytic Solution]

$LiPF_6$ was added to a solvent mixture of ethylene carbonate (EC) and diethyl carbonate (DEC) mixed in a ratio by volume of 3:7 to prepare a nonaqueous electrolytic solution having a concentration of 1.0 mol/L.

[Production of Nonaqueous Electrolyte Secondary Battery]

Lithium metal foil and the negative electrode provided with a Ni tab were arranged in an inert atmosphere so as to face each other with a polyethylene separator interposed therebetween, thereby forming an electrode assembly. The electrode assembly was placed in a battery case formed of an aluminum laminated film. The nonaqueous electrolytic solution was injected into the battery case. The battery case was sealed, thereby producing battery T9.

Example 10

Negative electrode active material A10 and battery T10 were produced in the same way as in Example 9, except that the treatment time with the ball mill was changed to 150 hours. In an XRD pattern of negative electrode active material A10, a peak which was observed at 2θ=about 27.0° and which corresponded to a plane with Miller indices (111) of $Li_2SiO_3$ had a full width at half maximum of 0.401°.

Example 11

Negative electrode active material A11 and battery T11 were produced in the same way as in Example 9, except that the treatment time with the ball mill was changed to 20 hours. In an XRD pattern of negative electrode active material A11, a peak which was observed at 2θ=about 27.0° and which corresponded to a plane with Miller indices (111) of $Li_2SiO_3$ had a full width at half maximum of 0.093°.

Example 12

Negative electrode active material A12 and battery T12 were produced in the same way as in Example 9, except that the treatment time with the ball mill was changed to 10 hours. In an XRD pattern of negative electrode active material A12, a peak which was observed at 2θ=about 27.0° and which corresponded to a plane with Miller indices (111) of $Li_2SiO_3$ had a full width at half maximum of 0.051°.

Example 13

Negative electrode active material A13 and battery T13 were produced in the same way as in Example 9, except that $Li_2Si_2O_5$ was used in place of $Li_2SiO_3$. In an XRD pattern of negative electrode active material A13, a peak which was observed at 2θ=about 24.9° and which corresponded to a plane with Miller indices (111) of $Li_2Si_2O_5$ had a full width at half maximum of 0.431°.

Example 14

Negative electrode active material A14 and battery T14 were produced in the same way as in Example 13, except that the treatment time with the ball mill was changed to 20 hours. In an XRD pattern of negative electrode active material A14, a peak which was observed at 2θ=about 24.9° and which corresponded to a plane with Miller indices (111) of $Li_2Si_2O_5$ had a full width at half maximum of 0.102°.

Example 15

Negative electrode active material A15 and battery T15 were produced in the same way as in Example 9, except that the treatment with the ball mill was performed at 150 rpm for 30 hours. In an XRD pattern of negative electrode active material A15, a peak which was observed at 2θ=about 27.0° and which corresponded to a plane with Miller indices (111) of $Li_2SiO_3$ had a full width at half maximum of 0.192°. The Si particles had an average particle diameter less than 200 nm.

Comparative Example 6

A Si powder (three nines (3 N), pulverized to 10 μm) and a $Li_2SiO_3$ powder (pulverized to 10 μm) were each pulverized in an inert atmosphere for 50 hours with the ball mill and then were mixed together in a ratio by mass of 42:58. The resulting mixture was directly used as negative electrode active material B6 without heat treatment. Battery R6 was produced in the same way as in Example 9. In negative electrode active material B1, while $Li_2SiO_3$ particles adhered to surfaces of the Si particles, a $Li_2SiO_3$ matrix (continuous phase) was not formed. That is, negative electrode active material B1 did not have a composite particle structure in which the Si particles were dispersed in the $Li_2SiO_3$ phase. In an XRD pattern of negative electrode active material B6, A peak which was observed at 2θ=about 27.0° and which corresponded to a plane with Miller indices (111) of $Li_2SiO_3$ had a full width at half maximum of 0.032°.

Comparative Example 7

Negative electrode active material B7 and battery R7 were produced in the same way as in Example 19, except that the treatment with the ball mill was performed at 50 rpm for 50 hours. In an XRD pattern of negative electrode active material B7, a peak which was observed at 2θ=about 27.0° and which corresponded to a plane with Miller indices (111) of $Li_2SiO_3$ had a full width at half maximum of 0.042°.

Comparative Example 8

Negative electrode active material B8 and battery R8 were produced in the same way as in Example 9, except that in the heat treatment after the pulverization treatment with the ball mill, the heat treatment was performed in an inert atmosphere at 1000° C. for 4 hours. In an XRD pattern of negative electrode active material B8, a peak which was observed at 2θ=about 27.0° and which corresponded to a plane with Miller indices (111) of $Li_2SiO_3$ had a full width at half maximum of 0.038°.

Regarding the batteries of Examples 8 to 15 and Comparative examples 6 to 8, the initial charge-discharge efficiency and the appearance of the negative electrode active material particles were evaluated by methods described below. Table 3 lists the evaluation results.

[Initial Charge-Discharge Efficiency]
Charge
Constant-current charge was performed at a current of 0.2 It until the voltage reached 0 V. Subsequently, constant-current charge was performed at a current of 0.05 It until the voltage reached 0 V.
Discharge
Constant-current discharge was performed at a current of 0.2 It until the voltage reached 1.0 V.
Interval
An interval between the charge and the discharge was 10 minutes.
The ratio of discharge capacity to charge capacity at the first cycle was defined as initial charge-discharge efficiency.

Initial charge-discharge efficiency (%)=discharge capacity at first cycle/charge capacity at first cycle×100

[Appearance Evaluation of Negative Electrode Active Material Particles (Check for Particle Breakage)]
After one charge-discharge cycle of the batteries, the batteries were disassembled in an inert atmosphere. The negative electrodes were removed from the disassembled batteries. Cross sections of the negative electrode active materials were exposed with a cross-section polisher (manufactured by JEOL, Ltd.) in an inert atmosphere. The cross sections were observed with a SEM to examine the particles for the presence or absence of particle breakage. A state in which two or more fine particles that had originally been a single particle are present in the cross section was defined as the particle breakage.

particles dispersed in the matrix composed of the lithium silicate in which a diffraction peak corresponding to a plane with Miller indices (111) has a full width at half maximum of 0.05° or more is used, the initial charge-discharge efficiency is improved, compared with the case where the negative electrode active material in which the full width at half maximum is less than 0.05°.

Example 16

[Production of Positive Electrode]
Lithium cobaltate, acetylene black (HS100, manufactured by Denki Kagaku Kogyo K.K.), and polyvinylidene fluoride (PVdF) were mixed together in a ratio by mass of 95:2.5:2.5. After N-methyl-2-pyrrolidone (NMP) serving as a dispersion medium was added to the resulting mixture, the mixture was stirred with a mixer (T.K. HIVIS MIX, manufactured by PRIMIX Corporation) to prepare a positive electrode mixture slurry. The positive electrode mixture slurry was applied to aluminum foil, dried, subjected to rolling with reduction rolls, thereby producing a positive electrode including a positive electrode mixture layer formed on each surface of the aluminum foil, the positive electrode mixture layer having a density of 3.6 $g/cm^3$.

[Production of Negative Electrode]
Negative electrode active material A9 used in Example 9 and graphite were mixed together in a ratio by mass of 5:95. The resulting mixture was used as negative electrode active material A16 (negative electrode active material A9: 5% by mass). Negative electrode active material A16, sodium carboxymethyl cellulose (CMC-Na), and styrene-butadiene rubber (SBR) were mixed together in a ratio by mass of 97.5:1.0:1.5. Water was added thereto. The resulting mixture was stirred with a mixer (T.K. HIVIS MIX, manufactured by PRIMIX Corporation) to prepare a negative electrode mixture slurry. The slurry was applied to copper foil in such a manner that the mass of a negative electrode mixture layer was 190 g per square meter. The resulting coating film was dried in air at 105° C. and subjected to rolling to produce a negative electrode including the negative electrode mixture layer formed on each surface of the copper foil, the negative electrode mixture layer having a density of 1.6 $g/cm^3$.

TABLE 3

| | Average particle diameter of Si | Lithium silicate | Full width at half maximum | Structure of particles | Initial charge-discharge efficiency | Uniformity in particle | Presence or absence of particle breakage |
|---|---|---|---|---|---|---|---|
| T9 | <100 nm | $Li_2SiO_3$ | 0.233 | composite particles | 79% | uniform | absent |
| T10 | <100 nm | | 0.401 | | 82% | uniform | absent |
| T11 | <100 nm | | 0.093 | | 73% | uniform | absent |
| T12 | <100 nm | | 0.051 | | 65% | uniform | absent |
| T13 | <100 nm | $Li_2Si_2O_5$ | 0.431 | | 82% | uniform | absent |
| T14 | <100 nm | | 0.102 | | 75% | uniform | absent |
| T15 | <200 nm | $Li_2SiO_3$ | 0.192 | | 81% | uniform | absent |
| R6 | <100 nm | | 0.032 | mixed particles | 60% | — | — |
| R7 | 500 nm | | 0.042 | composite particles | 61% | nonuniform | present |
| R8 | <100 nm | | 0.038 | | 60% | uniform | absent |

As listed in Table 3, in negative electrode active materials A9 to A15 of the examples, the particle breakage is less likely to be caused by charge and discharge, compared with negative electrode active materials B6 to B8 of the comparative examples. Batteries T9 to T15 of the examples have good initial charge-discharge efficiency, compared with batteries R6 to R8 of the comparative examples. That is, when the negative electrode active material containing the Si

[Production of Nonaqueous Electrolyte Secondary Battery]
Tabs were attached to the electrodes. The positive electrode and the negative electrode equipped with the tabs were spirally wound with a separator interposed therebetween in such a manner that the tabs were located at the outermost peripheral portion. The resulting electrode assembly was inserted into a case formed of an aluminum laminated sheet. After vacuum drying was performed at 105° C. for 2 hours, the nonaqueous electrolytic solution was injected. An opening portion of the case was sealed, thereby producing battery T16. The design capacity of the battery was 800 mAh.

Example 17

Negative electrode active material A17 and battery T17 were produced in the same way as in Example 16, except that the amount of negative electrode active material A9 added was changed to 10% by mass.

Example 18

Negative electrode active material A18 and battery T18 were produced in the same way as in Example 16, except that the amount of negative electrode active material A9 added was changed to 30% by mass.

Comparative Example 9

Negative electrode active material B9 and battery R9 were produced in the same way as in Example 16, except that negative electrode active material B6 used in Comparative example 6 was used in place of negative electrode active material A9.

Comparative Example 10

Negative electrode active material B10 and battery R10 were produced in the same way as in Comparative example 9, except that the amount of negative electrode active material B6 added was changed to 10% by mass.

Comparative Example 11

Negative electrode active material B11 and battery R11 were produced in the same way as in Comparative example 9, except that the amount of negative electrode active material B6 added was changed to 30% by mass.

Regarding the batteries of Examples 16 to 18 and Comparative examples 9 to 11, the initial charge-discharge efficiency and the charge-discharge cycle characteristics were evaluated by methods described below. Table 4 lists the evaluation results.

[Initial Charge-Discharge Efficiency]

Charge

Constant-current charge was performed at a current of 1 It (800 mA) until the voltage reached 4.2 V. Subsequently, voltage-constant charge was performed at a voltage of 4.2 V until the current reached 1/20 It (40 mA).

Discharge

Constant-current discharge was performed at a current of 1 It (800 mA) until the voltage reached 2.75 V.

Interval

An interval between the charge and the discharge was 10 minutes.

The initial charge-discharge efficiency of each of the batteries was measured under the charge-discharge conditions.

[Cycle Test]

Each of the batteries was subjected to a cycle test under the charge-discharge conditions. The number of cycles required to cause the discharge capacity to reach 80% of the discharge capacity at the first cycle was measured and was defined as a cycle life. The cycle life of each of the batteries is indicated as an index when the cycle life of battery R3 is defined as 100.

TABLE 4

| | A9 or B6 | Initial charge-discharge efficiency | Cycle life |
|---|---|---|---|
| T16 | 5% by mass | 92% | 105 |
| R9 | | 78% | 100 |
| T17 | 10% by mass | 89% | 55 |
| R10 | | 72% | 42 |
| T18 | 30% by mass | 81% | 43 |
| R11 | | 65% | 32 |

As listed in Table 4, each of batteries T16 to T18 of the examples had high initial charge-discharge efficiency and good cycle characteristics, compared with batteries R9 to R11 of the comparative examples.

REFERENCE SIGNS LIST

10 negative electrode active material particle, 11 lithium silicate phase, 12 silicon particle, 13 base particle, 14 conductive layer

The invention claimed is:

1. A negative electrode active material for a nonaqueous electrolyte secondary battery, comprising:
   a lithium silicate phase comprising $Li_2Si_2O_5$ and silicon particles dispersed in the lithium silicate phase,
   wherein a crystallinity of the $Li_2Si_2O_5$ is a diffraction peak corresponding to a (111) plane of $Li_2Si_2O_5$ in the XRD pattern has a full width at half maximum of in the range of 0.233° to 0.55°.

2. The negative electrode active material for a nonaqueous electrolyte secondary battery according to claim 1, wherein the content of $Li_2Si_2O_5$ is more than 50% by mass and more with respect to the total mass of the lithium silicate phase.

3. The negative electrode active material for a nonaqueous electrolyte secondary battery according to claim 1, wherein the content of $Li_2Si_2O_5$ is more than 80% by mass and more with respect to the total mass of the lithium silicate phase.

4. The negative electrode active material for a nonaqueous electrolyte secondary battery according to claim 1, wherein no peak originating from $SiO_2$ is observed at $2\theta=25°$ in an XRD pattern obtained by XRD measurement.

5. The negative electrode active material for a nonaqueous electrolyte secondary battery according to claim 1, wherein the lithium silicate phase does not include $Li_4SiO_4$.

6. The negative electrode active material for a nonaqueous electrolyte secondary battery according to claim 5, wherein the negative electrode active material does not include $Li_4SiO_4$.

7. The negative electrode active material for a nonaqueous electrolyte secondary battery according to claim 1, wherein lithium silicate in the lithium silicate phase consists essentially of $Li_2Si_2O_5$.

8. The negative electrode active material for a nonaqueous electrolyte secondary battery according to claim 1, wherein the silicon particles are substantially uniformly dispersed form in the lithium silicate phase.

9. The negative electrode active material for a nonaqueous electrolyte secondary battery according to claim 1, wherein the silicon particles have an average particle diameter of 200 nm or less before initial charge.

10. The negative electrode active material for a nonaqueous electrolyte secondary battery according to claim 1, wherein a conductive layer is formed on a surface of a base particle comprising the lithium silicate phase and the silicon particles.

11. The negative electrode active material for a nonaqueous electrolyte secondary battery according to claim 1,
wherein the content of $Li_2Si_2O_5$ is more than 80% by mass and more with respect to the total mass of the lithium silicate phase,
wherein the negative electrode active material does not include $Li_4SiO_4$.

12. The negative electrode active material for a nonaqueous electrolyte secondary battery according to claim 11, wherein a conductive layer is formed on a surface of a base particle comprising the lithium silicate phase and the silicon particles.

13. A nonaqueous electrolyte secondary battery comprising a negative electrode containing the negative electrode active material according to claim 1, a positive electrode, and a nonaqueous electrolyte.

14. A nonaqueous electrolyte secondary battery comprising a negative electrode containing the negative electrode active material according to claim 1, wherein the negative electrode further comprises graphite,
wherein a ratio by mass of the negative electrode active material to graphite is 1:99 to 30:70.

15. The negative electrode active material for a nonaqueous electrolyte secondary battery according to claim 1, wherein a crystallinity of the $Li_2Si_2O_5$ is a diffraction peak corresponding to a (111) plane of $Li_2Si_2O_5$ in the XRD pattern has a full width at half maximum of in the range of 0.431° to 0.55°.

* * * * *